(12) United States Patent
Chen et al.

(10) Patent No.: US 12,125,182 B2
(45) Date of Patent: Oct. 22, 2024

(54) IMAGE PROCESSING METHOD AND IMAGE PROCESSING APPARATUS

(71) Applicant: BOE Technology Group Co., Ltd., Beijing (CN)

(72) Inventors: Guannan Chen, Beijing (CN); Dan Zhu, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/754,192

(22) PCT Filed: Apr. 27, 2021

(86) PCT No.: PCT/CN2021/090192
§ 371 (c)(1),
(2) Date: Mar. 25, 2022

(87) PCT Pub. No.: WO2022/226771
PCT Pub. Date: Nov. 3, 2022

(65) Prior Publication Data
US 2024/0054622 A1   Feb. 15, 2024

(51) Int. Cl.
*G06T 5/00*   (2024.01)
*G06T 5/90*   (2024.01)
*G06T 7/90*   (2017.01)
*G06T 9/00*   (2006.01)
*G06V 10/44*  (2022.01)
(Continued)

(52) U.S. Cl.
CPC ............... *G06T 5/90* (2024.01); *G06T 7/90* (2017.01); *G06T 9/00* (2013.01); *G06V 10/44* (2022.01); *G06V 10/56* (2022.01); *H04N 1/6019* (2013.01); *G06T 2207/10024* (2013.01); *G06T 2207/20081* (2013.01); *G06T 2207/20208* (2013.01)

(58) Field of Classification Search
CPC .... G06T 5/90; G06T 7/90; G06T 9/00; G06T 2207/10024; G06T 2207/20081; G06T 2207/20208; G06V 10/56; G06V 10/44; H04N 1/6019
See application file for complete search history.

(56) References Cited

U.S. PATENT DOCUMENTS

| | | | |
|---|---|---|---|
| 2019/0206360 A1* | 7/2019 | Ström | H04N 1/642 |
| 2019/0325567 A1* | 10/2019 | Jones | G06T 5/60 |
| 2023/0084705 A1* | 3/2023 | Su | H04N 19/436 |
| | | | 375/240.02 |

* cited by examiner

*Primary Examiner* — David F Dunphy
(74) *Attorney, Agent, or Firm* — Intellectual Valley Law, P.C.

(57) ABSTRACT

The present disclosure provides an image processing method and an image processing apparatus. The image processing method includes: obtaining a to-be-converted SDR image; using a first convolutional network to perform feature analysis on the SDR image, to obtain N weights of the SDR image; where the N weights are respectively configured to characterize proportions of color information of the SDR image to color information characterized in preset N 3D lookup tables, the N 3D lookup tables are configured to characterize color information of different types; obtaining a first 3D lookup table for the SDR image according to the N weights and the N 3D lookup tables; using the first 3D lookup table to adjust the color information of the SDR image to obtain an HDR image; and using a second convolutional neural network to perform refinement correction on the HDR image to obtain an output image.

20 Claims, 6 Drawing Sheets

(51) Int. Cl.
*G06V 10/56* (2022.01)
*H04N 1/60* (2006.01)

IMAGE PROCESSING METHOD AND IMAGE PROCESSING APPARATUS

CROSS-REFERENCE TO RELATED APPLICATION

This application is the U.S. national phase of PCT Application No. PCT/CN2021/090192 filed on Apr. 27, 2021, which is incorporated herein by reference in its entirety.

TECHNICAL FIELD

Embodiments of the present disclosure relate to the field of image processing technologies, and in particular to an image processing method and an image processing apparatus.

BACKGROUND 4K (i.e., 4096x2160) high-dynamic range (HDR) video has gradually become main content of the new generation of display media. It has advantages of high definition, full color performance, and good fluency to satisfy increasingly higher viewing demands of users. Currently, 4K standard-dynamic range (SDR) video can be used to generate 4K HDR video. However, the process of using 4K SDR video to generate 4K HDR involves technologies of color gamut conversion (BT.709 to BT.2020), bit depth conversion (8 bits to 10 bits), HDR conversion (brightness and color enhancement, color style creativity, etc.), and the like. At present, in most cases, colorists use tool software for manual color generation.

SUMMARY

The embodiments of the present disclosure provide an image processing method and an image processing apparatus, which can solve the problem in the related art that, when an SDR image is used to generate an HDR image, it depends on manual toning and cannot automatically complete the toning.

In order to solve the above technical problems, the present disclosure is implemented as follows.

According to a first aspect, one embodiment of the present disclosure provides an image processing method, including: obtaining a to-be-converted SDR image; using a first convolutional network to perform feature analysis on the SDR image, to obtain N weights of the SDR image; wherein the N weights are respectively configured to characterize proportions of color information of the SDR image to color information characterized in preset N 3D lookup tables, the 3D lookup table is configured to adjust the color information of the SDR image to color information of a HDR image, the N 3D lookup tables are configured to characterize color information of different types; N is a positive integer greater than or equal to 2; obtaining a first 3D lookup table for the SDR image according to the N weights and the N 3D lookup tables; using the first 3D lookup table to adjust the color information of the SDR image to obtain an HDR image; using a second convolutional neural network to perform refinement correction on the HDR image to obtain an output image.

Optionally, before using the first convolutional network to perform feature analysis on the SDR image, the method further includes: decoding a SDR video stream to obtain a YUV image; converting the YUV image to a RGB image; normalizing the RGB image to obtain a normalized RGB image; performing non-linear conversion on the normalized RGB image to obtain a non-linear RGB image as the to-be-converted SDR image.

Optionally, the first convolutional neural network includes: a down-sampling module, multiple first convolutional modules, and a second convolutional module that are sequentially connected; the numbers of output channels of the multiple first convolutional modules gradually increase, and output scales gradually decrease; the number of output channels of the second convolutional module is N; each of the first convolutional modules includes a convolutional layer with a stride greater than 1, an activation function and a normalization layer.

Optionally, the first convolutional neural network further includes: a third convolutional module, connected between the last one of the first convolutional modules and the second convolutional module; the number of output channels of the third convolutional module is the same as the number of output channels of the last one of the first convolutional modules; the third convolutional module includes a convolutional layer with a stride greater than 1, an activation function, and Dropout.

Optionally, the obtaining the first 3D lookup table for the SDR image according to the N weights and the N 3D lookup tables, includes: multiplying the N weights by the corresponding 3D lookup tables respectively to obtain N products, and adding the N products to obtain the first 3D lookup table.

Optionally, the using the first 3D lookup table to adjust the color information of the SDR image to obtain the HDR image, includes: for each RGB data in the SDR image, using an interpolation method to obtain interpolated RGB data; based on the interpolated RGB data, querying the first 3D lookup table to obtain output data corresponding to the interpolated RGB data; and obtaining the HDR image based on the output data.

Optionally, the second convolutional network is a refine network based on Unet, and includes at least one processing module; each processing module includes a convolutional layer with a stride greater than 1, a residual block located after the convolutional layer, a deconvolution layer with a stride greater than 1, an adder, and a residual block located after the adder; and output scales of the convolutional layer and the deconvolution layer are the same.

Optionally, after using the second convolutional neural network to perform refinement correction on the HDR image to obtain the output image, the method further includes: performing color scale conversion and color gamut conversion on the output image to obtain a converted RGB image; converting the converted RGB image to a YUV image; and performing encoding processing on the YUV images to obtain an HDR video stream.

Optionally, the method further includes: training a network model including the first convolutional network and the second convolutional network with a training process including: obtaining multiple sets of training data pairs, wherein each set of training data pairs includes a SDR image for training and a real HDR image corresponding to the SDR image for training; inputting the SDR image for training to the first convolutional network for feature analysis to obtain N weights of the SDR image for training; according to the N weights and the preset N 3D lookup tables, obtaining a second 3D lookup table for the SDR image for training; using the second 3D lookup table to perform color adjustment on the SDR image for training to obtain a predicted HDR image; using the second convolutional neural network to perform refinement correction on the predicted HDR image to obtain a predicted output image; determining a first loss of the first convolutional network and a second loss of the second convolutional network according to the real HDR image, the second 3D lookup table and the predicted output image; obtaining a total loss of the network model according to the first loss and the second loss; and optimizing the network model according to the total loss to obtain a trained network model.

Optionally, at least one of the first loss and the second loss is calculated using the following function:

$$MSE = \frac{1}{M}\sum_{i=1}^{M}(y_i - x_i)^2$$

wherein MSE represents loss, M represents the number of input SDR images for training, $x_i$ represents a predicted value, and $y_i$ represents a real value.

According to a second aspect, one embodiment of the present disclosure provides an image processing apparatus, including: an obtaining module, configured to obtain a to-be-converted SDR image; a weight obtaining module, configured to use a first convolutional network to perform feature analysis on the SDR image, to obtain N weights of the SDR image; wherein the N weights are respectively configured to characterize proportions of color information of the SDR image to color information characterized in preset N 3D lookup tables, the 3D lookup table is configured to adjust the color information of the SDR image to color information of a HDR image, the N 3D lookup tables are configured to characterize color information of different types; N is a positive integer greater than or equal to 2; a fusion module, configured to obtain a first 3D lookup table for the SDR image according to the N weights and the N 3D lookup tables; a color adjustment module, configured to use the first 3D lookup table to adjust the color information of the SDR image to obtain an HDR image; a correction module, configured to use a second convolutional neural network to perform refinement correction on the HDR image to obtain an output image.

According to a third aspect, one embodiment of the present disclosure provides a computing device system, including at least one computing device. Each computing device includes a processor, a memory, and a program or instructions stored in the memory and executable on the processor; the processor executes the program or instruction to implement the steps of the image processing method according to the foregoing first aspect.

According to a fourth aspect, one embodiment of the present disclosure provides a non-transitory computer readable storage medium, including a program or instruction stored thereon; wherein the program or instruction is executed by a processor to implement the steps of the image processing method according to the foregoing first aspect.

In embodiments of the present disclosure, the manual toning process required for generating an HDR image from an SDR image in the related art can be converted to automated implementation, which greatly saves labor costs, reduces the threshold for image production, improves production efficiency, and finely correct the toned image to improve the display quality.

BRIEF DESCRIPTION OF THE DRAWINGS

By reading the following detailed description of the preferred implementations, various other advantages and benefits will become clear to those of ordinary skill in the art. The drawings are only used for the purpose of illustrating the preferred implementations, and are not considered as a limitation to the present disclosure. Also, throughout the drawings, the same reference symbols are used to denote the same components. Among the drawings.

DETAILED DESCRIPTION

The technical solutions of embodiments of the present disclosure will be described hereinafter in a clear and complete manner in conjunction with the drawings of the embodiments. Obviously, the described embodiments are merely a part of, rather than all of, the embodiments of the present disclosure, and based on these embodiments, a person skilled in the art may obtain the other embodiments without inventive effort, which also fall within the scope of the present disclosure.

Figure 1:
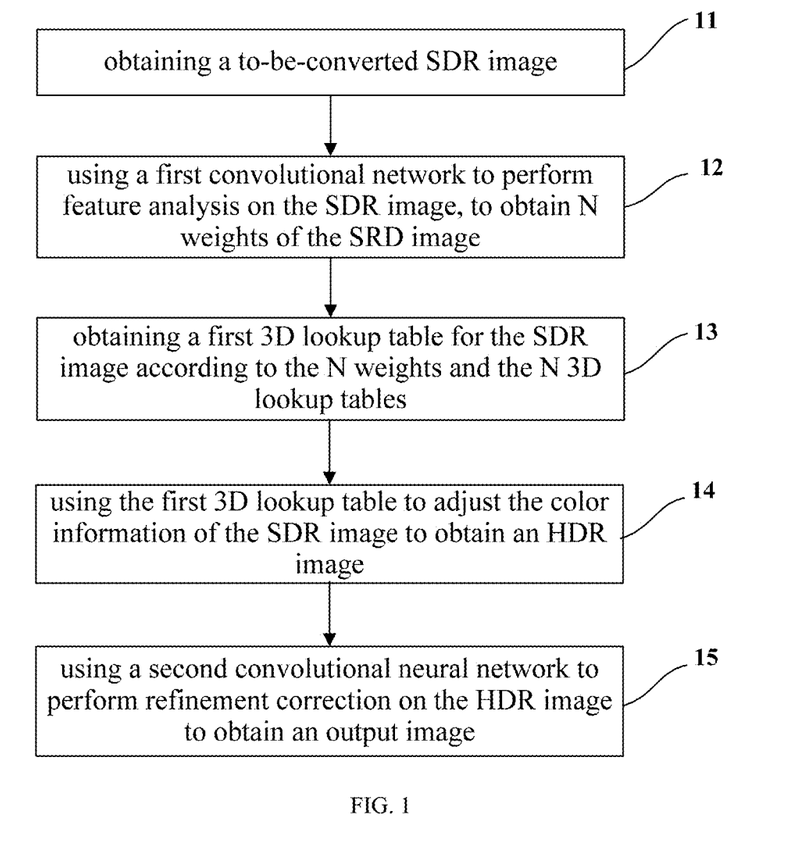
FIG. 1 is a flowchart of an image processing method according to an embodiment of the present disclosure.

Referring to FIG. 1, FIG. 1 is a flowchart of an image processing method according to an embodiment of the present disclosure. The image processing method includes:

Step 11: obtaining a to-be-converted SDR image;

Step 12: using a first convolutional network to perform feature analysis on the SDR image, to obtain N weights of the SDR image; where the N weights are respectively configured to characterize proportions of color information of the SDR image to color information characterized in preset N 3D lookup tables, the 3D lookup table is configured to adjust the color information of the SDR image to color information of a HDR image, the N 3D lookup tables are configured to characterize color information of different types; N is a positive integer greater than or equal to 2.

In one embodiment of the present disclosure, optionally, the N weights are in one-to-one correspondence with the N 3D lookup tables.

In one embodiment of the present disclosure, optionally, the color information includes at least one of the following: color tone style, brightness preference, saturation, and the like.

In one embodiment of the present disclosure, the value of N may be set as required, for example, it may be 7.

Step 13: obtaining a first 3D lookup table for the SDR image according to the N weights and the N 3D lookup tables;

Step 14: using the first 3D lookup table to adjust the color information of the SDR image to obtain an HDR image;

Step 15: using a second convolutional neural network to perform refinement correction on the HDR image to obtain an output image.

The refinement correction includes correcting at least one of the following parameters: color cast, noise, color block, etc.

In one embodiment of the present disclosure, an SDR image is converted into an HDR image. Of course, in some other embodiments of the present disclosure, conversion between other types of dynamic ranges is not excluded, and the present disclosure does not limit it.

The image processing method of embodiments of the present disclosure may be to process a single image or to process a video image.

In one embodiment of the present disclosure, the manual toning process required for generating an HDR image from an SDR image in the related art can be converted to automated implementation, which greatly saves labor costs, reduces the threshold for image production, improves production efficiency, and finely correct the toned image to improve the display quality.

In one embodiment of the present disclosure, generally, it is necessary to first convert a SDR video stream to a YUV image, then convert the YUV image into a RGB image, and then input it to the convolutional neural network for processing. Therefore, in the embodiment of the present disclosure, before an image is input to the first convolutional neural network, the image needs to be preprocessed to convert a YUV image to a RGB image.

That is, optionally, in the embodiment of the present disclosure, before inputting a SDR image to the first convolutional neural network for feature analysis, the method further includes:

Step 01: decoding the SDR video stream to obtain a YUV image;

Step 02: converting the YUV image to a RGB image;

Step 03: normalizing the RGB image to obtain a normalized RGB image;

Step 04: performing non-linear conversion on the normalized RGB image to obtain a non-linear RGB image as the to-be-converted SDR image.

Figure 2:
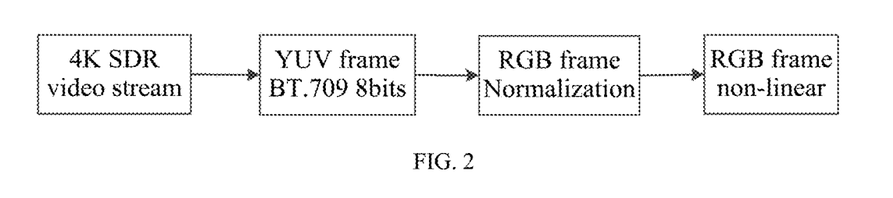
FIG. 2 is a flowchart of an image preprocessing process according to an embodiment of the present disclosure.

Referring to FIG. 2, FIG. 2 is a flowchart of a preprocessing process according to an embodiment of the present disclosure. In this embodiment, a 4K SDR video stream needs to be converted to a 4K HDR video stream. Before the 4K SDR video stream is input to the convolutional network, the 4K SDR video stream needs to be preprocessed to be converted to RGB images. The preprocessing process includes: first, decoding the 4K SDR video stream, and storing the decoded data as YUV image frames (BT.709 8 bit); converting the YUV image frames to RGB image frames, and performing normalization processing to obtain normalized RGB image frames; and converting the normalized RGB image frames to non-linear RGB image frames.

Similarly, the RGB image processed by the second convolutional neural network further needs to be converted to a YUV image. That is, after obtaining the output image by using the second convolutional neural network to perform refinement correction on the HDR image, the method further includes:

Step 21: performing color scale conversion and color gamut conversion on the output image to obtain a converted RGB image; where the color scale conversion includes, for example, 1024 color scale conversion (8 bits to 10 bits), and the color gamut conversion includes, for example, BT.2020 color gamut conversion (BT.709 to BT.2020);

Step 22: converting the converted RGB image to a YUV image;

Step 23: performing encoding processing on the YUV images to obtain an HDR video stream.

The above process may be referred to as a post-processing process, which is reverse process of the above described preprocessing.

Figure 3:
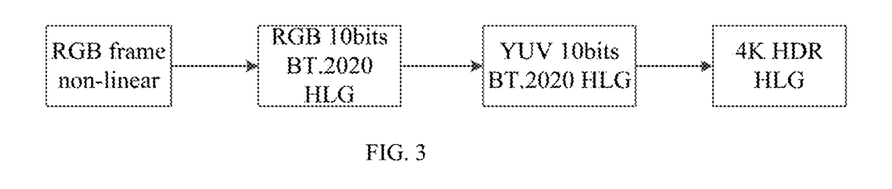
FIG. 3 is a flowchart of an image post-processing process according to an embodiment of the present disclosure.

Referring to FIG. 3, FIG. 3 is a flowchart of a post-processing process according to an embodiment of the present disclosure. In this embodiment, a 4K SDR video stream needs to be converted to 4K HDR video stream. Before the 4K SDR video stream is input to the first convolutional network, the 4K SDR video stream needs to be preprocessed to be converted to RGB images. After the RGB images are processed by the second convolutional network, the RGB images need to be post-processed to be converted to a 4K HDR video stream. The post-processing process includes: first, converting a RGB 8 bits image frame to a RGB 10 bits image frame (BT.2020 HLG), then converting the RGB 10 bit image frame to a YUV 10 bits image frame (BT.2020 HLG), and finally converting the YUV 10 bits image frame to 4K HDR HLG video stream. HLG is hybrid log gamma.

Figure 4:
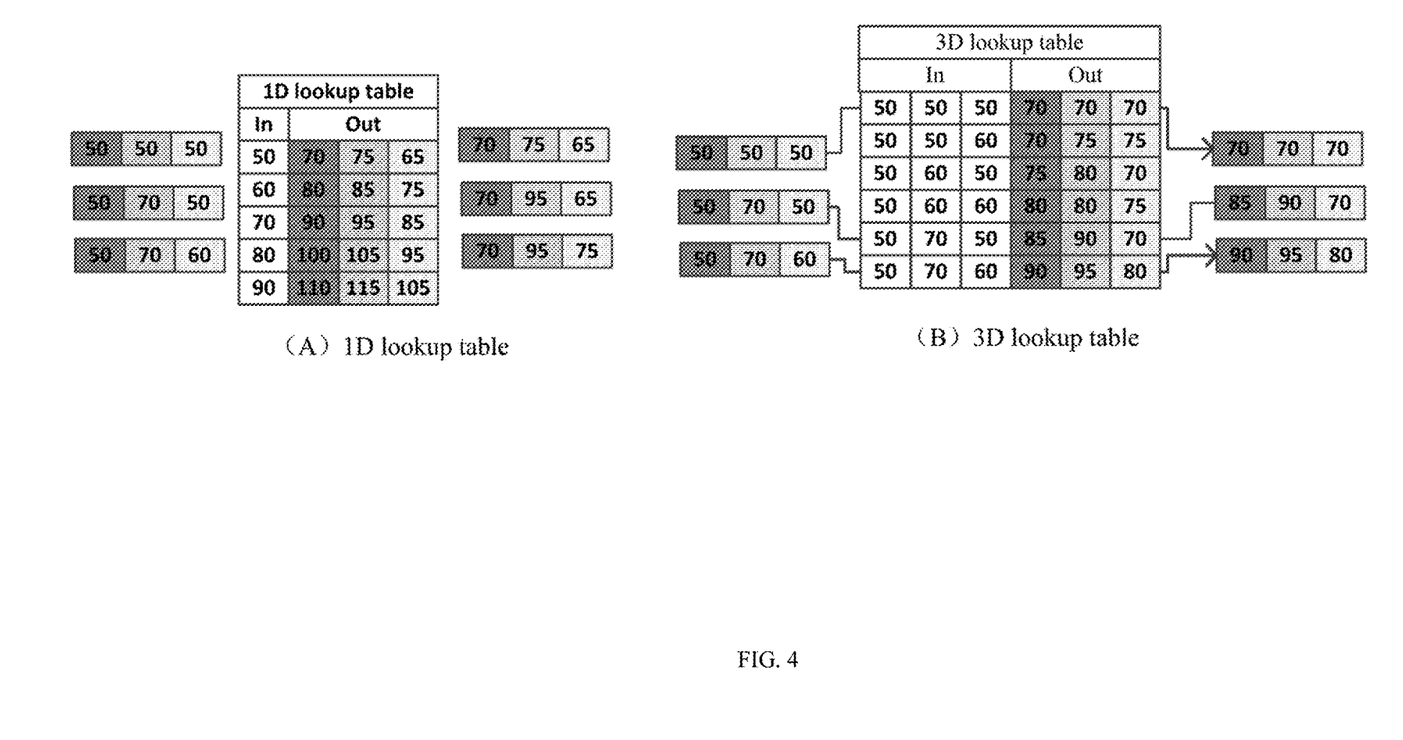
FIG. 4 is a schematic diagram showing comparison between 1D lookup table and 3D lookup table.

The 3D lookup table is used to, according to RGB values of an input image, find corresponding output values. Referring to FIG. 4, compared with the 1D lookup table which can only control a single-channel color output with output of each channel being independent of each other, output of three RGB channels of the 3D lookup table are correlated. Further, the capacity of the 3D lookup table is large. For example, the 64-level lookup table has more than 260,000 color output values (1D lookup table has only 765 color output values), which makes the color brightness output more accurate and real. Moreover, the large-capacity 3D lookup table data can also store subjective information such as toning style and brightness preference.

Since the 3D lookup table itself is a large-capacity numerical matrix, and the process of calculating the output can be derived and differentiable (the trilinear interpolation formula can be directly derived), the 3D lookup table may be generated by a colorist's experience output or may be a sub-network formed through a training process.

In one embodiment of the present disclosure, optionally, based on the N weights and the N 3D lookup tables, obtaining a first 3D lookup table for the SDR image includes: multiplying the N weights by the corresponding 3D lookup tables respectively to obtain N products, and adding the N products to obtain the first 3D lookup table. Of course, in some other embodiments of the present disclosure, other methods are not excluded to obtain the above described first 3D lookup table.

In one embodiment of the present disclosure, optionally, using the first 3D lookup table to adjust the color information of the SDR image to obtain an HDR image, includes:

Step 131: for each RGB data in the SDR image, using an interpolation method to obtain interpolated RGB data; where optionally, a trilinear interpolation method may be used to calculate the interpolated RGB data;

Step 132: based on the interpolated RGB data, querying the first 3D lookup table to obtain output data corresponding to the interpolated RGB data;

Step 133: obtaining the HDR image based on the output data.

In one embodiment of the present disclosure, optionally, the first convolutional neural network is a CNN regression network.

In one embodiment of the present disclosure, optionally, the second convolutional neural network is a CNN fine network.

Figure 5:
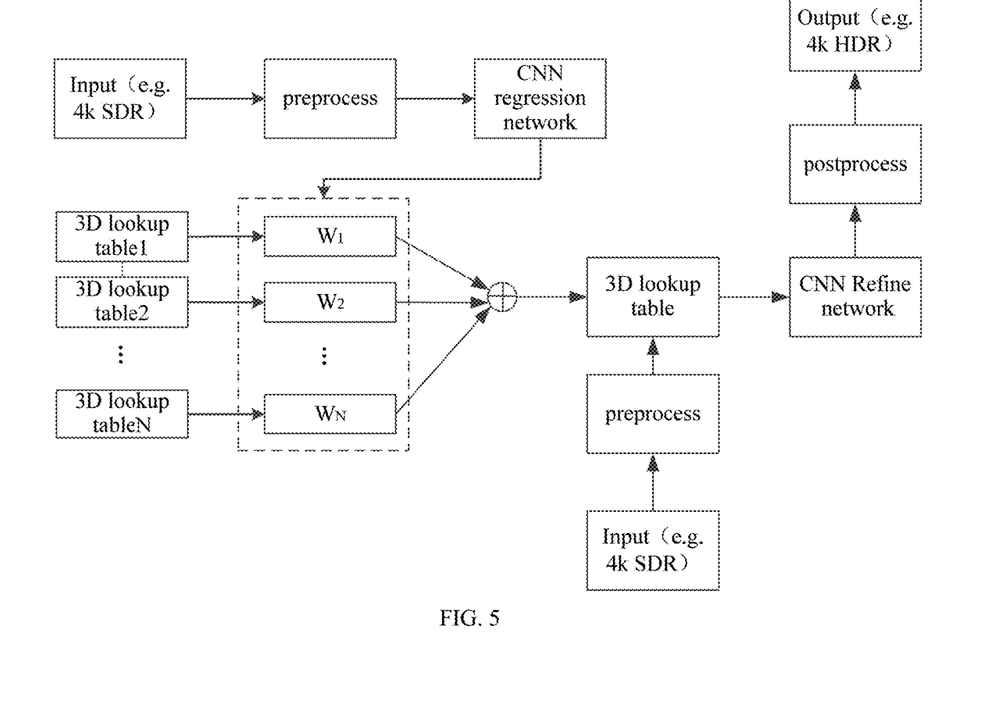
FIG. 5 is a schematic diagram of a network model according to an embodiment of the present disclosure.

Referring to FIG. 5, FIG. 5 is a schematic diagram of a network model according to an embodiment of the present disclosure. The working process of the network model is as follows.

The working process of the network model includes: first, inputting a to-be-processed SDR video stream (e.g., 4K SDK video stream), and preprocessing the to-be-processed SDR video stream to obtain a SDR image, where the SDR image is a RGB image; inputting the SDR image to CNN regression network for feature analysis to obtain N weights ($W_1, W_2, \ldots W_n$), where the N weights are in one-to-one correspondence with preset N 3D lookup tables (including 3D lookup tables 1, 3D lookup table 2, ... 3D lookup table N), respectively; and multiplying the N weights by the corresponding 3D lookup tables respectively to obtain N products, and adding the N products to obtain a fused 3D lookup table for the SDR image.

The working process of the network model further includes: inputting the preprocessed SDR image to the fused 3D lookup table to obtain an HDR image (for example, a 4K HDR image), where the HDR image is an RGB image; inputting the HDR image to the CNN fine network to be finely processed to obtain the finely processed HDR image; and post-processing the finely processed HDR image to obtain and output a HDR video stream.

In the above image network structure, the two preprocessing modules may be combined into one.

The structures of the first convolutional network and the second convolutional network of one embodiment of the present disclosure are respectively described hereinafter.

In one embodiment of the present disclosure, optionally, the first convolutional neural network includes: a down-sampling module, multiple first convolutional modules, and a second convolutional module that are sequentially connected. The numbers of output channels of the multiple first convolutional modules gradually increase, and output scales gradually decrease. The number of output channels of the second convolutional module is N. Each of the first convolutional modules includes a convolutional layer with a stride greater than 1, an activation function and a normalization layer.

In one embodiment of the present disclosure, the output scale may also be referred to as output resolution.

In one embodiment of the present disclosure, the numbers of output channels of the multiple first convolutional modules gradually increase; further optionally, the numbers of output channels of adjacent first convolutional modules increase by multiples. For example, the number of the first convolutional modules is 4, and the numbers of output channels of the 4 first convolutional modules are 16, 32, 64, 128, respectively.

In one embodiment of the present disclosure, the convolutional layer with a stride greater than 1 may also perform down-sampling while performing feature extraction.

In one embodiment of the present disclosure, optionally, the stride is equal to 2.

In one embodiment of the present disclosure, optionally, the activation function may be LeakyRelu, and of course the activation function may adopt other activation functions.

In one embodiment of the present disclosure, optionally, the first convolutional neural network further includes: a third convolutional module, connected between the last one of the first convolutional modules and the second convolutional module. The number of output channels of the third convolutional module is the same as the number of output channels of the last one of the first convolutional modules. The third convolutional module includes a convolutional layer with a stride greater than 1, an activation function, and Dropout.

In one embodiment of the present disclosure, optionally, the activation function may be LeakyRelu; and of course, the activation function may adopt other activation functions.

In one embodiment of the present disclosure, Dropout is a function of the convolutional neural network to avoid overfitting.

Figure 6:
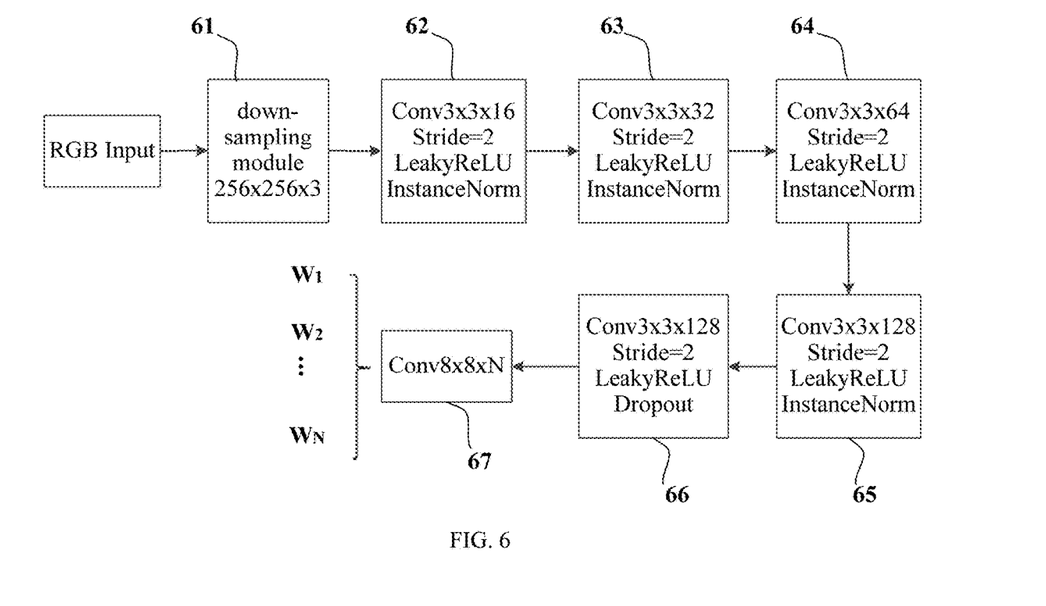
FIG. 6 is a schematic diagram of a first convolutional network according to an embodiment of the present disclosure.

Referring to FIG. 6, FIG. 6 is a schematic diagram of the first convolutional network according to an embodiment of the present disclosure. The first convolutional network includes: a down-sampling module 61, four first convolutional modules (62, 63, 64 and 65), a third convolutional module 66 and a second convolutional module 67 that are sequentially connected. The working process of the first convolutional network includes: first, inputting a RGB image (a SDR image) to the down-sampling module 61 to obtain a down-sampled image, for example, a 256λ256λ3 down-sampled image; inputting the down-sampled image to the first one of the first convolutional module 62, to obtain a 128λ128×16 output image, where the first one of the first convolutional module 62 includes: a convolutional layer (Conv3×3×16) with a stride of 2, an activation function LeakyRelu and a normalization layer (InstanceNorm); inputting an output of the first one of the first convolutional module 62 to the second one of the first convolutional module 63 to obtain a 64×64×32 output image, where the second one of the first convolutional module 63 includes: a convolutional layer (Conv3×3×32) with a stride of 2, an activation function LeakyRelu and a normalization layer (InstanceNorm); inputting an output of the second one of the first convolutional module 63 to the third one of the second convolutional module 64, to obtain a 32×32×64 output image, where the third one of the first convolutional module 64 includes: a convolutional layer (Conv3×3×64) with a stride of 2, an activation function LeakyRelu and an normalization layer (InstanceNorm); inputting an output of the third one of the first convolutional module 64 to the fourth one of the second convolutional module 65 to obtain a 16×16×128 output image, where the fourth one of the first convolutional module 65 includes: a convolutional layer (Conv3×3×128) with a stride of 2, an activation function LeakyRelu and a normalization layer (InstanceNorm); inputting an output of the fourth one of the first convolutional module 65 to the third convolutional module 66 to obtain a 8×8×128 output image, where the third convolutional module 66 includes: a convolutional layer (Conv3×3×128) with a stride of 2, an activation function LeakyRelu and Dropout; inputting an output of the third convolutional module 66 to the second convolutional module 67 to obtain N weights ($W_1, W_2, \ldots W_n$), where the second convolutional module 67 includes a convolutional layer (Conv8×8×N).

In one embodiment of the present disclosure, optionally, the second convolutional network is a refine network based on Unet, and includes at least one processing module. Each processing module includes a convolutional layer with a stride greater than 1, a residual block located after the convolutional layer, a deconvolution layer with a stride greater than 1, an adder, and a residual block located after the adder. Output scales of the convolutional layer and the deconvolution layer are the same.

In one embodiment of the present disclosure, a residual block is connected after each of the convolutional layer and the deconvolution layer, which can ensure circulation of feature information of different scales among the layers. In one embodiment of the present disclosure, the convolutional layer with a stride greater than 1 may also perform down-sampling while performing feature extraction. The deconvolution layer with a stride greater than 1 may also perform up-sampling while performing feature extraction.

Figure 7:
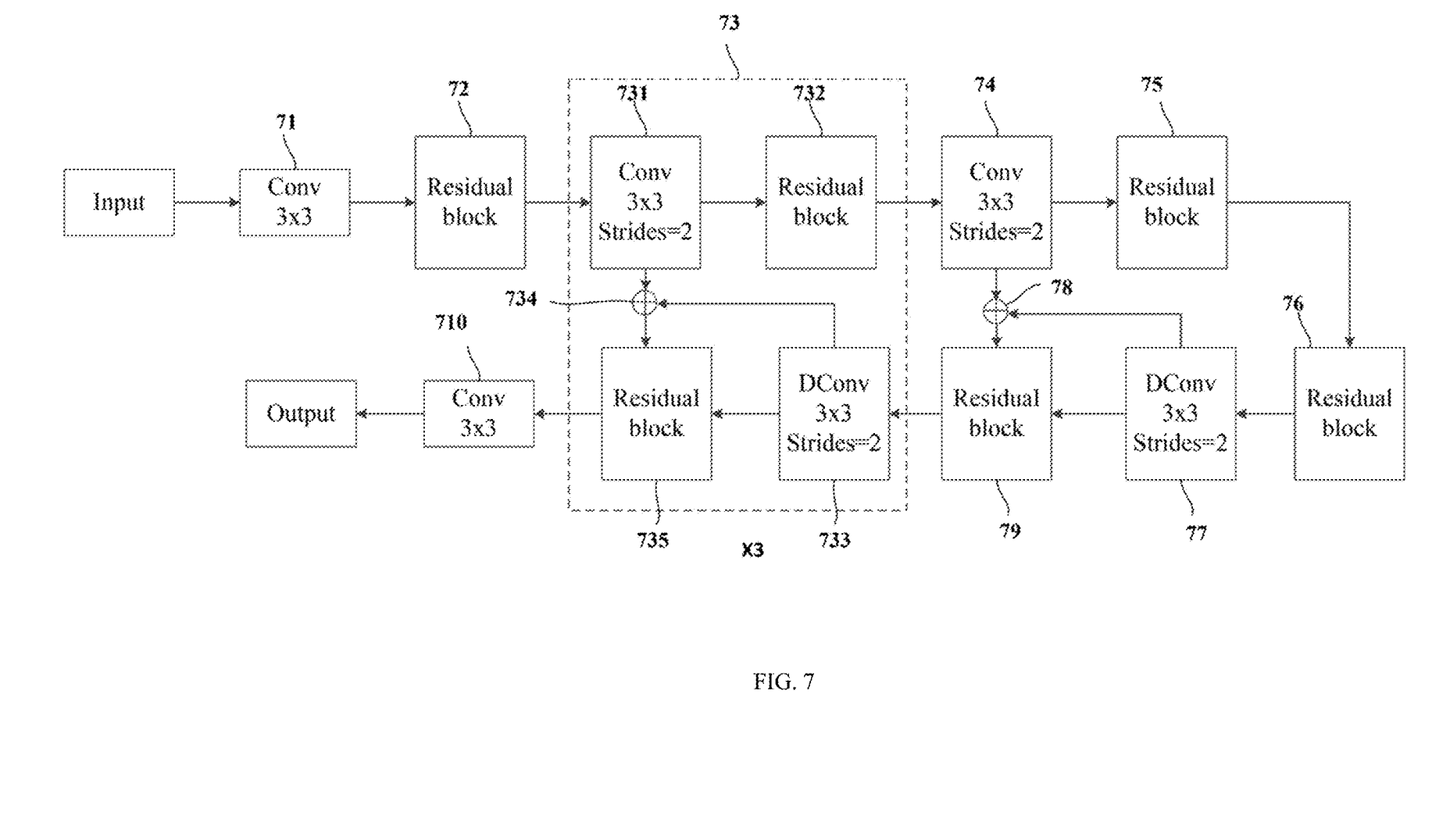
FIG. 7 is a schematic diagram of a second convolutional network according to an embodiment of the present disclosure.

Referring to FIG. 7, FIG. 7 is a schematic diagram of a second convolutional network according to an embodiment of the present disclosure. The second convolutional network includes: a convolutional module 71, a residual block 72, three processing modules 73 (X3 in FIG. 7 means three processing modules 73), a convolutional module 74, a residual block 75, a residual block 76, a deconvolution module 77, an adder 78, a residual block 79 and a convolutional module 710. The working process of the second convolutional network is as follows.

The working process of the second convolutional network includes: obtaining a to-be-processed RGB image (HDR image); inputting the RGB image to the convolutional module 71 for processing, and outputting to the residual block 72. The convolutional module 71 includes a 3×3 convolutional kernel.

The three processing modules 73 are sequentially connected, and each processing module 73 includes: a 3×3 convolutional layer 731 with a stride of 2, a residual block 732 located after the convolutional layer 731, a 3×3 deconvolution layer 733 with a stride of 2, an adder 734 and a residual block 735 located after the adder 734. Output scales of the convolutional layer 731 and the deconvolution layer 733 are the same. An output of the convolutional layer 731 is input to the residual block 732; after an output of the deconvolution layer 733 and the output of the convolutional layer 731 are input to the adder 734 for adding, inputting an addition result to the residual block 735. An output of the residual block 72 is an input of the convolutional layer 731 of the first processing module 73; an output of the residual block 732 of the first processing module 73 is an input of the convolutional layer 731 of the second processing module 73; an output of the residual block 735 of the first processing module 73 is an input of the convolutional module 710; an output of the residual block 732 of the second processing module 73 is an input of the convolutional layer 731 of the third processing module 73; an output of the residual block 735 of the second processing modules 73 is an input of the deconvolution layer 733 of the first processing module 73; an output of the residual block 732 of the third processing module 73 is an input of the convolution module 74; and an output of the residual block 735 of the third processing modules 73 is an input of the deconvolution layer 733 of the second processing module 73.

An output of convolutional module 74 is an input of the residual block 75 and the adder 78, respectively. The convolutional module 74 includes a 3×3 convolutional layer with stride of 2. An output of the residual block 75 is an input of the residual block 76; an output of the residual block 76 is an input of the deconvolution module 77. The deconvolution module 77 includes a 3×3 deconvolution layer with stride of 2. An output of the deconvolution module 77 is an input of the adder 78. The adder 78 adds the outputs of the convolutional module 74 and the deconvolution module 77 with an output result as an input of the residual block 79. An output of the residual block 79 is an input of the deconvolution layer 733 of the third processing module 73.

An output of the residual block 735 of the first processing module 73 is an input of the convolutional module 710; and an output result of the convolutional module 710 is an output result of the second convolutional network.

Figure 8:
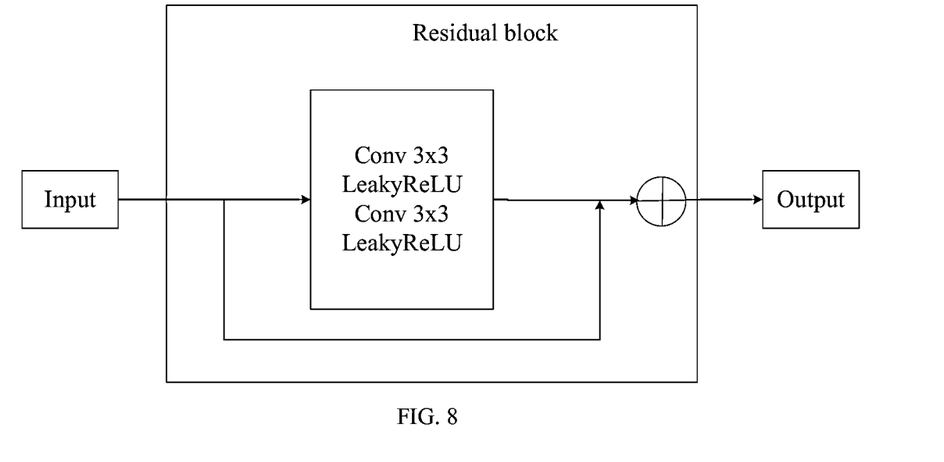
FIG. 8 is a schematic diagram of a residual block according to an embodiment of the present disclosure.

In one embodiment of the present disclosure, optionally, the residual block includes at least a convolutional module and an adder. The input of the residual block enters the at least one convolutional module to obtain an output; and both of the output and the input of the residual block are input to the adder to obtain an output of the residual block. Each convolutional module includes a convolutional layer and an activation function. Referring to FIG. 8, FIG. 8 is a schematic diagram of a residual block according to an embodiment of the present disclosure. The residual block includes two convolutional modules. Each convolutional module includes a 3×3 convolutional layer and an activation function LeakyRelu.

Figure 9:
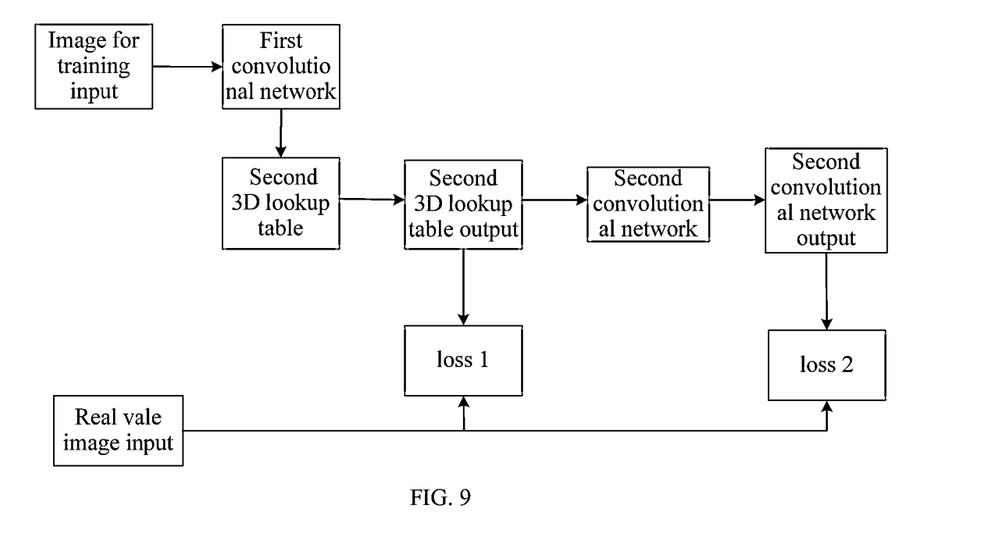
FIG. 9 is a schematic diagram of a training method of a network structure according to an embodiment of the present disclosure.

In one embodiment of the present disclosure, optionally, the image processing method further includes: training a network model including the first convolutional network and the second convolutional network. Referring to FIG. 9, the training process includes:

Step 91: obtaining multiple sets of training data pairs, where each set of training data pairs includes a SDR image for training and a real HDR image corresponding to the SDR image for training;

Step 92: inputting the SDR image for training to the first convolutional network for feature analysis to obtain N weights of the SDR image for training;

Step 93: according to the N weights and preset N 3D lookup tables, obtaining a second 3D lookup table for the SDR image for training; where, optionally, the second 3D lookup table may be obtained by multiplying the N weights by the corresponding 3D lookup tables respectively to obtain N products, and adding the N products to obtain the second 3D lookup table; of course, in some other embodiments of the present disclosure, the above described second 3D lookup table may be obtained via other methods;

Step 94: using the second 3D lookup table to perform color adjustment on the SDR image for training to obtain a predicted HDR image;

Step 95: using the second convolutional neural network to perform refinement correction on the predicted HDR image to obtain a predicted output image;

Step 96: determining a first loss (loss 1) of the first convolutional network and a second loss (loss 2) of the second convolutional network according to the real HDR image, the second 3D lookup table and the predicted output image;

Step 97: obtaining a total loss of the network model according to the first loss and the second loss;

Step 98: optimizing the network model according to the total loss to obtain a trained network model.

Optionally, at least one of the first loss and the second loss is calculated using the following function:

$$MSE = \frac{1}{M}\sum_{i=1}^{M}(y_i - x_i)^2$$

where, MSE represents loss, M represents the number of input SDR images for training, $x_i$ represents a predicted value, and $y_i$ represents a real value.

Figure 10:
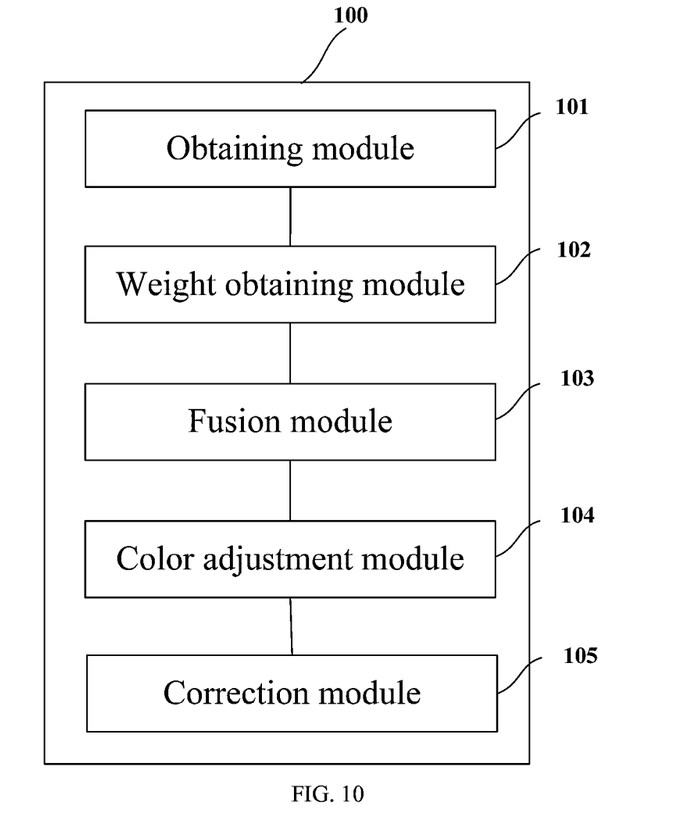
FIG. 10 is a schematic diagram of an image processing apparatus according to an embodiment of the present disclosure.

Referring to FIG. 10, one embodiment of the present disclosure further provides an image processing apparatus 100, which includes:

an obtaining module 101, configured to obtain a to-be-converted SDR image;

a weight obtaining module 102, configured to use a first convolutional network to perform feature analysis on the SDR image, to obtain N weights of the SDR image; where the N weights are respectively configured to characterize proportions of color information of the SDR image to color information characterized in preset N 3D lookup tables, the 3D lookup table is configured to adjust the color information of the SDR image to color information of a HDR image, the N 3D lookup tables are configured to characterize color information of different types; N is a positive integer greater than or equal to 2;

a fusion module 103, configured to obtain a first 3D lookup table for the SDR image according to the N weights and the N 3D lookup tables;

a color adjustment module 104, configured to use the first 3D lookup table to adjust the color information of the SDR image to obtain an HDR image;

a correction module 105, configured to use a second convolutional neural network to perform refinement correction on the HDR image to obtain an output image.

In one embodiment of the present disclosure, the manual toning process required for generating an HDR image from an SDR image in the related art can be converted to automated implementation, which greatly saves labor costs, reduces the threshold for image production, improves production efficiency, and finely correct the toned image to improve the display quality.

Optionally, the image processing apparatus further includes:

a pre-weight obtaining module, configured to decode the SDR video stream to obtain a YUV image; convert the YUV image to a RGB image; normalize the RGB image to obtain a normalized RGB image; and perform non-linear conversion on the normalized RGB image to obtain a non-linear RGB image as the to-be-converted SDR image.

Optionally, the first convolutional neural network includes: a down-sampling module, multiple first convolutional modules, and a second convolutional module that are sequentially connected. The numbers of output channels of the multiple first convolutional modules gradually increase, and output scales gradually decrease. The number of output channels of the second convolutional module is N. Each of the first convolutional modules includes a convolutional layer with a stride greater than 1, an activation function and a normalization layer.

Optionally, the first convolutional neural network further includes: a third convolutional module, connected between the last one of the first convolutional modules and the second convolutional module. The number of output channels of the third convolutional module is the same as the number of output channels of the last one of the first convolutional modules. The third convolutional module includes a convolutional layer with a stride greater than 1, an activation function, and Dropout.

Optionally, the fusion module is configured to multiply the N weights by the corresponding 3D lookup tables respectively to obtain N products, and add the N products to obtain the first 3D lookup table.

Optionally, the color adjustment module is configured to, for each RGB data in the SDR image, use an interpolation method to obtain interpolated RGB data; based on the interpolated RGB data, query the first 3D lookup table to obtain output data corresponding to the interpolated RGB data; and obtain the HDR image based on the output data.

Optionally, the second convolutional network is a refine network based on Unet, and includes at least one processing module. Each processing module includes a convolutional layer with a stride greater than 1, a residual block located after the convolutional layer, a deconvolution layer with a stride greater than 1, an adder, and a residual block located after the adder. Output scales of the convolutional layer and the deconvolution layer are the same.

Optionally, the image processing apparatus further includes:

a post-weight obtaining module, configured to perform color scale conversion and color gamut conversion on the output image to obtain a converted RGB image; convert the converted RGB image to a YUV image; and perform encoding processing on the YUV images to obtain an HDR video stream.

Optionally, the image processing apparatus further includes:

a training module, configured to train a network model including the first convolutional network and the second convolutional network with a training process including: obtaining multiple sets of training data pairs, where each set of training data pairs includes a SDR image for training and a real HDR image corresponding to the SDR image for training; inputting the SDR image for training to the first convolutional network for feature analysis to obtain N weights of the SDR image for training; according to the N weights and preset N 3D lookup tables, obtaining a second 3D lookup table for the SDR image for training; using the second 3D lookup table to perform color adjustment on the SDR image for training to obtain a predicted HDR image; using the second convolutional neural network to perform refinement correction on the predicted HDR image to obtain a predicted output image; determining a first loss of the first convolutional network and a second loss of the second convolutional network according to the real HDR image, the second 3D lookup table and the predicted output image; obtaining a total loss of the network model according to the first loss and the second loss; and optimizing the network model according to the total loss to obtain a trained network model.

Optionally, at least one of the first loss and the second loss is calculated using the following function:

$$MSE = \frac{1}{M}\sum_{i=1}^{M}(y_i - x_i)^2$$

where, MSE represents loss, M represents the number of input SDR images for training, $x_i$ represents a predicted value, and $y_i$ represents a real value.

Figure 11:
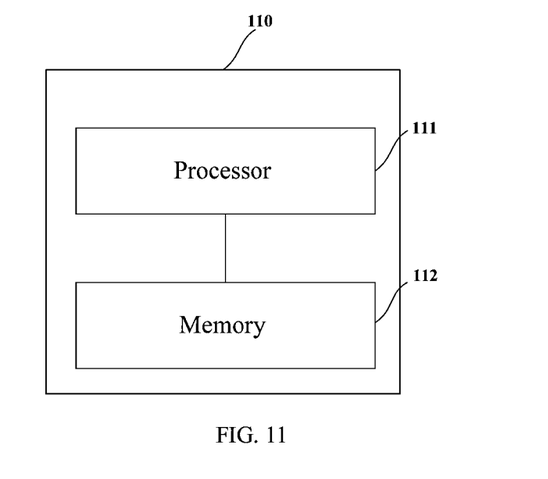
FIG. 11 is a schematic diagram of an electronic device according to an embodiment of the present disclosure.

Referring to FIG. 11, one embodiment of the present disclosure further provides a computing device system 110, which includes at least one computing device. Each computing device includes a processor 111, a memory 112, a computer program stored in the memory 112 and executable on the processor 111. When the computer program is executed by the processor 111, each procedure of the above image processing method embodiments can be implemented, and the same technical effect can be achieved, which will not be repeated here to avoid repetition.

The embodiments of the present disclosure further provide a computer-readable storage medium on which a computer program is stored. When the computer program is executed by a processor, each procedure of the above image processing method embodiments can be implemented, and the same technical effect can be achieved, which will not be repeated here to avoid repetition. The computer-readable storage medium may be, such as a read-only memory (ROM), a random access memory (RAM), a magnetic disk, or an optical disk, etc.

It should be noted that herein, the terms "include", "comprise" or any other variants thereof are intended to cover non-exclusive inclusion, so that a process, method, article or apparatus including a series of elements not only includes those elements, but also includes other elements that are not explicitly listed, or elements inherent to the process, method, article, or apparatus. If there are no more restrictions, the element defined by the sentence "including a . . . " does not exclude the existence of other same elements in the process, method, article, or apparatus that includes the element.

Through the description of the above implementation, those skilled in the art can clearly understand that the above methods embodiment may be implemented by means of software and the necessary general hardware platform. Of course, it may also be implemented by hardware, but in many cases the former is better implementation. Based on this understanding, the technical solution of the present disclosure essentially or the part that contributes to the existing technology may be embodied in the form of a software product, and the computer software product is stored in a storage medium (such as ROM/RAM, a magnetic disk, an optical disc) including several instructions to enable a terminal (which may be a mobile phone, a computer, a server, an air conditioner, or a network device, etc.) to execute the methods described in the various embodiments of the present disclosure.

The embodiments of the present disclosure are described above with reference to the accompanying drawings, but the present disclosure is not limited to the above specific implementation. The above specific implementation is only illustrative and not restrictive. Under the enlightenment of the present disclosure, many forms may be made by those of ordinary skill in the art without departing from the purpose of the present disclosure and the scope of protection of the claims, all of which fall within the protection of the present disclosure.

What is claimed is:

1. An image processing method, comprising:
obtaining a to-be-converted standard-dynamic range (SDR) image;
using a first convolutional network to perform feature analysis on the SDR image, to obtain N weights of the SDR image; wherein the N weights are respectively configured to characterize proportions of color information of the SDR image to color information characterized in preset N 3D lookup tables, an individual 3D lookup table of the N 3D lookup tables is configured to adjust the color information of the SDR image to color information of a HDR image, the N 3D lookup tables are configured to characterize color information of different types; N is a positive integer greater than or equal to 2;
obtaining a first 3D lookup table for the SDR image according to the N weights and the N 3D lookup tables;
using the first 3D lookup table to adjust the color information of the SDR image to obtain an HDR image;
using a second convolutional network to perform refinement correction on the HDR image to obtain an output image.

2. The method according to claim 1, wherein before using the first convolutional network to perform feature analysis on the SDR image, the method further includes:
decoding a SDR video stream to obtain a YUV image;
converting the YUV image to a RGB image;
normalizing the RGB image to obtain a normalized RGB image;
performing non-linear conversion on the normalized RGB image to obtain a non-linear RGB image as the to-be-converted SDR image.

3. The method according to claim 1, wherein the first convolutional network includes: a down-sampling module, multiple first convolutional modules, and a second convolutional module that are sequentially connected; a number of output channels of the multiple first convolutional modules gradually increase, and output scales gradually decrease; a number of output channels of the second convolutional module is N; each of the first convolutional modules includes a convolutional layer with a stride greater than 1, an activation function and a normalization layer.

4. The method according to claim 3, wherein the first convolutional network further includes: a third convolutional module, connected between the last one of the first convolutional modules and the second convolutional module; a number of output channels of the third convolutional module is the same as a number of output channels of the last one of the first convolutional modules; the third convolutional module includes a convolutional layer with a stride greater than 1, an activation function, and Dropout.

5. The method according to claim 1, wherein the obtaining the first 3D lookup table for the SDR image according to the N weights and the N 3D lookup tables, includes: multiplying the N weights by the corresponding 3D lookup tables respectively to obtain N products, and adding the N products to obtain the first 3D lookup table.

6. The method according to claim 1, wherein the using the first 3D lookup table to adjust the color information of the SDR image to obtain the HDR image, includes:
for each RGB data in the SDR image, using an interpolation method to obtain interpolated RGB data;
based on the interpolated RGB data, querying the first 3D lookup table to obtain output data corresponding to the interpolated RGB data; and
obtaining the HDR image based on the output data.

7. The method according to claim 1, wherein the second convolutional network is a refine network based on Unet, and includes at least one processing module; each processing module includes a convolutional layer with a stride greater than 1, a residual block located after the convolutional layer, a deconvolution layer with a stride greater than 1, an adder, and a residual block located after the adder; and output scales of the convolutional layer and the deconvolution layer are the same.

8. The method according to claim 1, wherein after using the second convolutional network to perform refinement correction on the HDR image to obtain the output image, the method further includes:

performing color scale conversion and color gamut conversion on the output image to obtain a converted RGB image;

converting the converted RGB image to a YUV image; and performing encoding processing on the YUV images to obtain an HDR video stream.

9. The method according to claim 1, wherein the method further includes:

training a network model including the first convolutional network and the second convolutional network with a training process including:

obtaining multiple sets of training data pairs, wherein each set of training data pairs includes a SDR image for training and a real HDR image corresponding to the SDR image for training;

inputting the SDR image for training to the first convolutional network for feature analysis to obtain N weights of the SDR image for training;

according to the N weights and the preset N 3D lookup tables, obtaining a second 3D lookup table for the SDR image for training;

using the second 3D lookup table to perform color adjustment on the SDR image for training to obtain a predicted HDR image;

using the second convolutional network to perform refinement correction on the predicted HDR image to obtain a predicted output image;

determining a first loss of the first convolutional network and a second loss of the second convolutional network according to the real HDR image, the second 3D lookup table and the predicted output image;

obtaining a total loss of the network model according to the first loss and the second loss; and optimizing the network model according to the total loss to obtain a trained network model.

10. The method according to claim 9, wherein at least one of the first loss and the second loss is calculated using the following function:

$$MSE = \frac{1}{M}\sum_{i=1}^{M}(y_i - x_i)^2$$

wherein MSE represents loss, M represents a number of input SDR images for training, $X_i$ represents a predicted value, and $y_i$ represents a real value.

11. An image processing apparatus, comprising:

an obtaining module, configured to obtain a to-be-converted standard-dynamic range (SDR) image;

a weight obtaining module, configured to use a first convolutional network to perform feature analysis on the SDR image, to obtain N weights of the SDR image; wherein the N weights are respectively configured to characterize proportions of color information of the SDR image to color information characterized in preset N 3D lookup tables, an individual 3D lookup table of the N 3D lookup tables is configured to adjust the color information of the SDR image to color information of a HDR image, the N 3D lookup tables are configured to characterize color information of different types; N is a positive integer greater than or equal to 2;

a fusion module, configured to obtain a first 3D lookup table for the SDR image according to the N weights and the N 3D lookup tables;

a color adjustment module, configured to use the first 3D lookup table to adjust the color information of the SDR image to obtain an HDR image;

a correction module, configured to use a second convolutional network to perform refinement correction on the HDR image to obtain an output image.

12. A computing device system, comprising at least one computing device; wherein each computing device includes a processor, a memory, and a program or instructions stored in the memory and executable on the processor; the processor executes the program or instruction to implement:

obtaining a to-be-converted standard-dynamic range (SDR) image;

using a first convolutional network to perform feature analysis on the SDR image, to obtain N weights of the SDR image; wherein the N weights are respectively configured to characterize proportions of color information of the SDR image to color information characterized in preset N 3D lookup tables, an individual 3D lookup table of the N 3D lookup tables is configured to adjust the color information of the SDR image to color information of a HDR image, the N 3D lookup tables are configured to characterize color information of different types; N is a positive integer greater than or equal to 2;

obtaining a first 3D lookup table for the SDR image according to the N weights and the N 3D lookup tables;

using the first 3D lookup table to adjust the color information of the SDR image to obtain an HDR image;

using a second convolutional network to perform refinement correction on the HDR image to obtain an output image.

13. The computing device system according to claim 12, wherein before using the first convolutional network to perform feature analysis on the SDR image, the processor executes the program or instruction to implement:

decoding a SDR video stream to obtain a YUV image;
converting the YUV image to a RGB image;
normalizing the RGB image to obtain a normalized RGB image;
performing non-linear conversion on the normalized RGB image to obtain a non-linear RGB image as the to-be-converted SDR image.

14. The computing device system according to claim 12, wherein the first convolutional network includes: a down-sampling module, multiple first convolutional modules, and a second convolutional module that are sequentially connected; a number of output channels of the multiple first convolutional modules gradually increase, and output scales gradually decrease; a number of output channels of the second convolutional module is N; each of the first convolutional modules includes a convolutional layer with a stride greater than 1, an activation function and a normalization layer.

15. The computing device system according to claim 14, wherein the first convolutional network further includes: a third convolutional module, connected between the last one of the first convolutional modules and the second convolutional module; a number of output channels of the third convolutional module is the same as a number of output channels of the last one of the first convolutional modules; the third convolutional module includes a convolutional layer with a stride greater than 1, an activation function, and Dropout.

16. The computing device system according to claim 12, wherein when obtaining the first 3D lookup table for the SDR image according to the N weights and the N 3aD lookup tables, the processor executes the program or instruction to implement: multiplying the N weights by the corresponding 3D lookup tables respectively to obtain N products, and adding the N products to obtain the first 3D lookup table.

17. The computing device system according to claim 12, wherein when using the first 3D lookup table to adjust the color information of the SDR image to obtain the HDR image, the processor executes the program or instruction to implement:
   for each RGB data in the SDR image, using an interpolation method to obtain interpolated RGB data;
   based on the interpolated RGB data, querying the first 3D lookup table to obtain output data corresponding to the interpolated RGB data; and
   obtaining the HDR image based on the output data.

18. The computing device system according to claim 12, wherein the second convolutional network is a refine network based on Unet, and includes at least one processing module; each processing module includes a convolutional layer with a stride greater than 1, a residual block located after the convolutional layer, a deconvolution layer with a stride greater than 1, an adder, and a residual block located after the adder; and output scales of the convolutional layer and the deconvolution layer are the same.

19. The computing device system according to claim 12, wherein after using the second convolutional network to perform refinement correction on the HDR image to obtain the output image, the processor executes the program or instruction to implement:
   performing color scale conversion and color gamut conversion on the output image to obtain a converted RGB image;
   converting the converted RGB image to a YUV image; and
   performing encoding processing on the YUV images to obtain an HDR video stream.

20. A non-transitory computer readable storage medium, comprising a program or instruction stored thereon; wherein the program or instruction is executed by a processor to implement the steps of the image processing method according to claim 1.

* * * * *